United States Patent
Hollabaugh

(10) Patent No.: US 9,568,218 B2
(45) Date of Patent: Feb. 14, 2017

(54) SOLAR ARRAY POWER OUTPUT MAXIMIZATION THROUGH CORRECTED SUN TRACKING METHODS

(71) Applicant: BrightLeaf Technologies, Inc., Montrose, CO (US)

(72) Inventor: Craig Hollabaugh, Montrose, CO (US)

(73) Assignee: BRIGHTLEAF TECHNOLOGIES, INC., Montrose, CO (US)

( * ) Notice: Subject to any disclaimer, the term of this patent is extended or adjusted under 35 U.S.C. 154(b) by 361 days.

(21) Appl. No.: 13/683,941

(22) Filed: Nov. 21, 2012

(65) Prior Publication Data

US 2014/0137924 A1    May 22, 2014

(51) Int. Cl.
    *F24J 2/54*    (2006.01)
    *F24J 2/38*    (2014.01)

(52) U.S. Cl.
    CPC  *F24J 2/542* (2013.01); *F24J 2/38* (2013.01); *H02S 20/32* (2014.12); *Y02E 10/47* (2013.01); *Y02E 10/52* (2013.01)

(58) Field of Classification Search
    CPC .............. Y02E 10/47; F24J 2002/0416; F24J 2002/075; F24J 2/38; F24J 2/02; F24J 2/06; F24J 2002/385; F24J 2/40; F24J 2/5417; G01S 3/782–3/7861
    USPC .......... 250/203.4, 214 R, 221; 126/600–608, 126/572–578; 356/139.01; 136/206
    See application file for complete search history.

(56) References Cited

U.S. PATENT DOCUMENTS

| | | | | |
|---|---|---|---|---|
| 4,365,617 | A * | 12/1982 | Bugash | F24J 2/07 126/578 |
| 7,378,628 | B2 * | 5/2008 | Maldziunas | B60H 1/0075 250/203.4 |
| 8,178,775 | B2 * | 5/2012 | Taylor et al. | 136/246 |
| 2003/0045949 | A1 * | 3/2003 | Stone et al. | 700/61 |
| 2004/0079863 | A1 * | 4/2004 | Lasich | 250/203.4 |
| 2009/0223509 | A1 | 9/2009 | Hoellenriegel et al. | |

(Continued)

FOREIGN PATENT DOCUMENTS

| | | |
|---|---|---|
| EP | 2012366 A2 | 1/2009 |
| JP | 2002-081763 A | 3/2002 |

OTHER PUBLICATIONS

International Preliminary Report on Patentability (PCT/US2011/056114), dated Apr. 16, 2013.

(Continued)

*Primary Examiner* — Francis M Legasse, Jr.
(74) *Attorney, Agent, or Firm* — Bracewell LLP; Keith R. Derrington

(57) ABSTRACT

An array of solar collectors track the sun based on measured values of power output from the array and from a sun sensor on the array. The sun is tracked by periodically adjusting the altitude and azimuth of the array so the collectors remain pointed at the sun to maximize an amount of solar flux reflected from the collectors. The sun sensor, which detects alignment of the sun, recognizes when relative movement of the sun causes about a 10% reduction in power output of the array. The altitude and azimuth of the array are readjusted based on output from the sun sensor. While the array is being reoriented, power output from the array is monitored, and values for power output versus orientation of the array are recorded. Offset values between the power output, sun sensor output, and the ephemeral equations are calculated by comparing these values during operation.

15 Claims, 6 Drawing Sheets

(56) References Cited

U.S. PATENT DOCUMENTS

| | | | |
|---|---|---|---|
| 2010/0018518 A1 | 1/2010 | McDonald | |
| 2010/0185333 A1* | 7/2010 | Oosting | 700/279 |
| 2010/0212653 A1* | 8/2010 | McDonald | 126/573 |
| 2010/0294337 A1* | 11/2010 | Sherman et al. | 136/246 |
| 2011/0094565 A1 | 4/2011 | Banin et al. | |
| 2011/0224831 A1* | 9/2011 | Beardsworth | F24J 2/38 |
| | | | 700/275 |
| 2012/0037209 A1 | 2/2012 | Buger et al. | |
| 2012/0158362 A1 | 6/2012 | Vandevelde et al. | |
| 2012/0266938 A1 | 10/2012 | Goei et al. | |
| 2012/0325313 A1* | 12/2012 | Cheung et al. | 136/259 |
| 2012/0325314 A1* | 12/2012 | Cheung et al. | 136/259 |
| 2013/0019920 A1* | 1/2013 | Kinsey | 136/246 |

OTHER PUBLICATIONS

International Search Report with Written Opinion issued in related PCT application PCT/US2013/070979, dated Mar. 4, 2014, 9 pages.
Reda et al., "Solar Position Algorithm for Solar Radiation Applications", NREL Report NREL/TP-560-34302 (Jan. 2008).

* cited by examiner

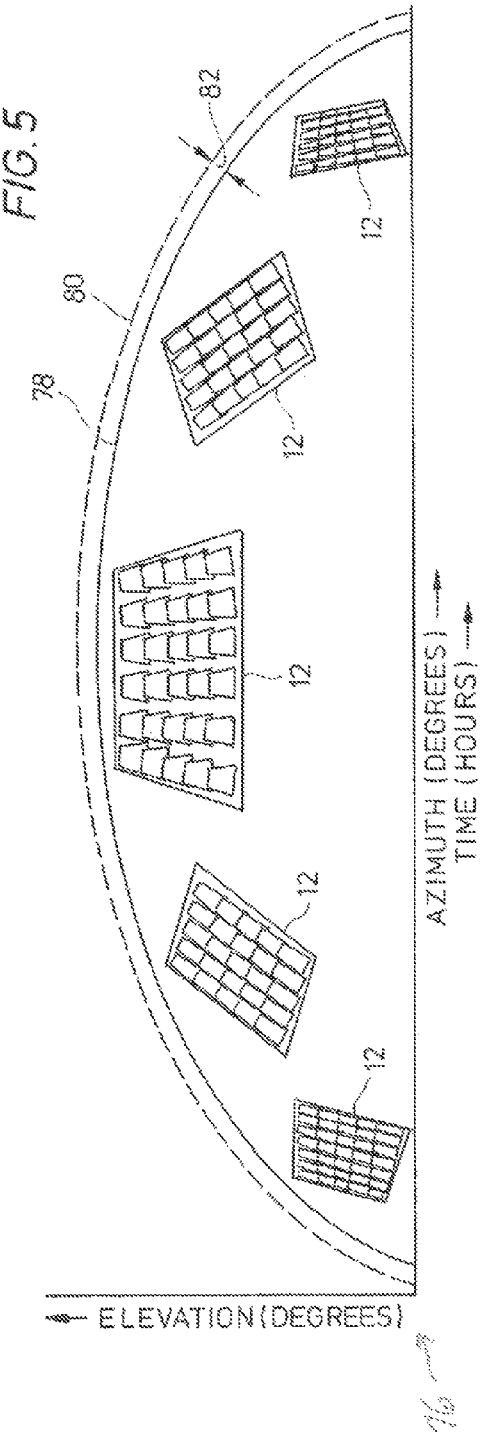
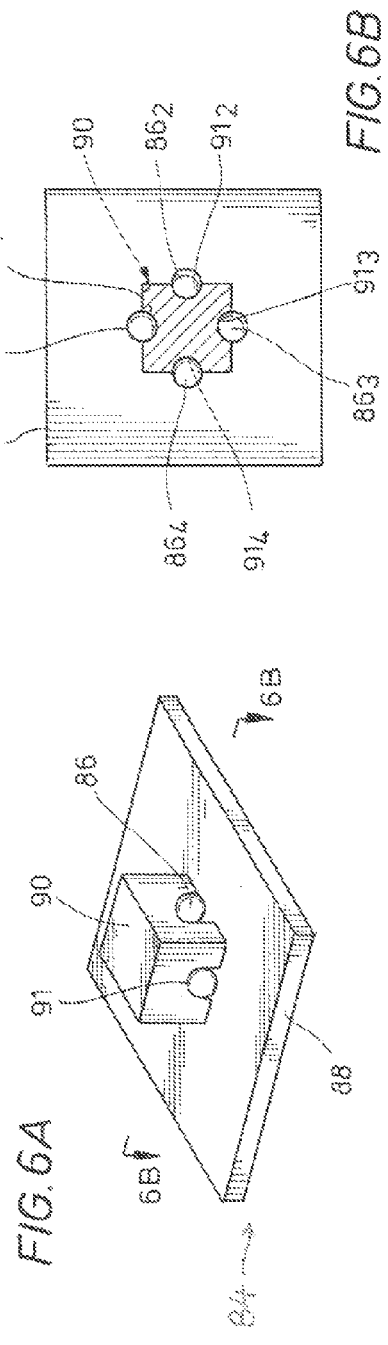

SOLAR ARRAY POWER OUTPUT MAXIMIZATION THROUGH CORRECTED SUN TRACKING METHODS

BACKGROUND

1. Field of Invention

The invention relates to maximizing output from a concentrated photovoltaic (CPV) system. More specifically, the invention relates generally to a method of identifying an offset for positioning solar collectors in an orientation so a maximum amount of solar energy reflects from the solar collectors.

2. Description of Prior Art

Converting solar energy into electricity is often accomplished by directing the solar energy onto one or more photovoltaic cells. The photovoltaic cells are typically made from semiconductors, that can absorb energy from photons from the solar energy, and in turn generate electron flow within the cell. A solar panel is a group of these cells that are electrically connected and packaged so an array of panels can be produced; which is typically referred to as a flat panel system. An array of panels used together is typically referred to as a solar flat panel photovoltaic (PV) system. Solar systems are typically positioned so that on the average they receive rays of light directly from the sun.

Some solar energy systems, which are referred to as Concentrated Photo Voltaic (CPV) systems, concentrate solar radiation onto a solar cell. CPV systems include solar collectors with a curved reflective surface that when exposed to sunlight reflects the light into a concentrated and focused image onto the solar cell. However, unless the collectors are substantially aligned with the sun, the image becomes unfocused to cause a corresponding reduction of power output from the CPV system. While tracking systems are generally included with CPV systems to maintain alignment of the solar collectors with the sun; misalignments can remain due to inherent manufacturing tolerances in CPV systems.

SUMMARY OF THE INVENTION

Provided herein is a method of positioning an array of solar collectors. In an example, the method includes monitoring an output from a sun sensor positioned on the array, identifying when the output from the sun sensor reaches a designated value, reorienting the array based on the designated value, monitoring a power output from the array, estimating an offset value based on a comparison between the output from the sun sensor and the power output from the array, and adjusting orientation of the array based on the offset value. In this example, the step of monitoring a power output from the array can occur when the array is being reoriented. In an example, the sun sensor has an acceptance angle that is greater than an acceptance angle of the solar collectors. Optionally, the step of reorienting the array includes adjusting an elevation of one end of the array and adjusting an azimuthal orientation of the array. In an alternative, estimating an offset value includes estimating a difference between an orientation of the array when the output from the sun sensor is at about a maximum value, and an orientation of the array when the power output from the array is at about a maximum value. In this example, the orientation of the array can be its elevation, its azimuth, or both. The method may further include identifying an orientation of the array corresponding to a maximum power output of the array to define a maximum power orientation, comparing the maximum power orientation with an ephemeral orientation to define an ephemeral offset, and adjusting orientation of the array based on the ephemeral orientation and the ephemeral offset. In this example, the method can continue to orient the array for maximum power output when the sun sensor is obscured by clouds or other obstructions. Alternatively, the solar collectors reflect light from the sun to generate power, and when reorienting, the array is moved into an orientation that is ahead of an on-axis orientation with the sun, so that the solar collectors will be on-axis with the sun at a future time due to relative movement of the sun.

Also disclosed herein is another method of orienting an array of solar collectors with a path of the sun. This method includes sensing an intensity of the sun at a particular location on the array, adjusting an orientation of the array when the sensed intensity is at a designated value, monitoring a power output from the array and the sensed intensity as the orientation of the array is being adjusted, identifying an orientation of the array when the power output is at a maximum value to define a maximum power orientation, and identifying an orientation of the array when the sensed intensity is at a maximum value to define a maximum intensity orientation, estimating a sensing offset by comparing the maximum power orientation with the maximum intensity orientation, and further adjusting the orientation of the array by the sensing offset. The steps of this example method can be repeated so that the array is at an on-axis orientation with the sun. Optionally, an axis of rays from the sun is aligned with an edge of an acceptance angle of the array, and the array is positioned so that the path of the sun moves the axis to an opposite edge of the acceptance angle of the array. In an example, the intensity of the sun is measured with a sun sensor having an acceptance angle having a value at least twice of a value of an acceptance angle of the array. The array can include modules, and the method can further include monitoring an output power from each of the modules.

BRIEF DESCRIPTION OF THE DRAWINGS

Some of the features and benefits of the present invention having been stated, others will become apparent as the description proceeds when taken in conjunction with the accompanying drawings, in which:

FIG. 5 is a graphical illustration of the array of FIG. 1 in example orientations over a period of time and corresponding plots of elevation and azimuth in accordance with the present invention.

FIG. 6A is a perspective view of an example of a sun sensor for use with the array of FIG. 1 in accordance with the present invention.

FIG. 6B is a plan view of the sun sensor of FIG. 6A in accordance with the present invention.

Figure 1:
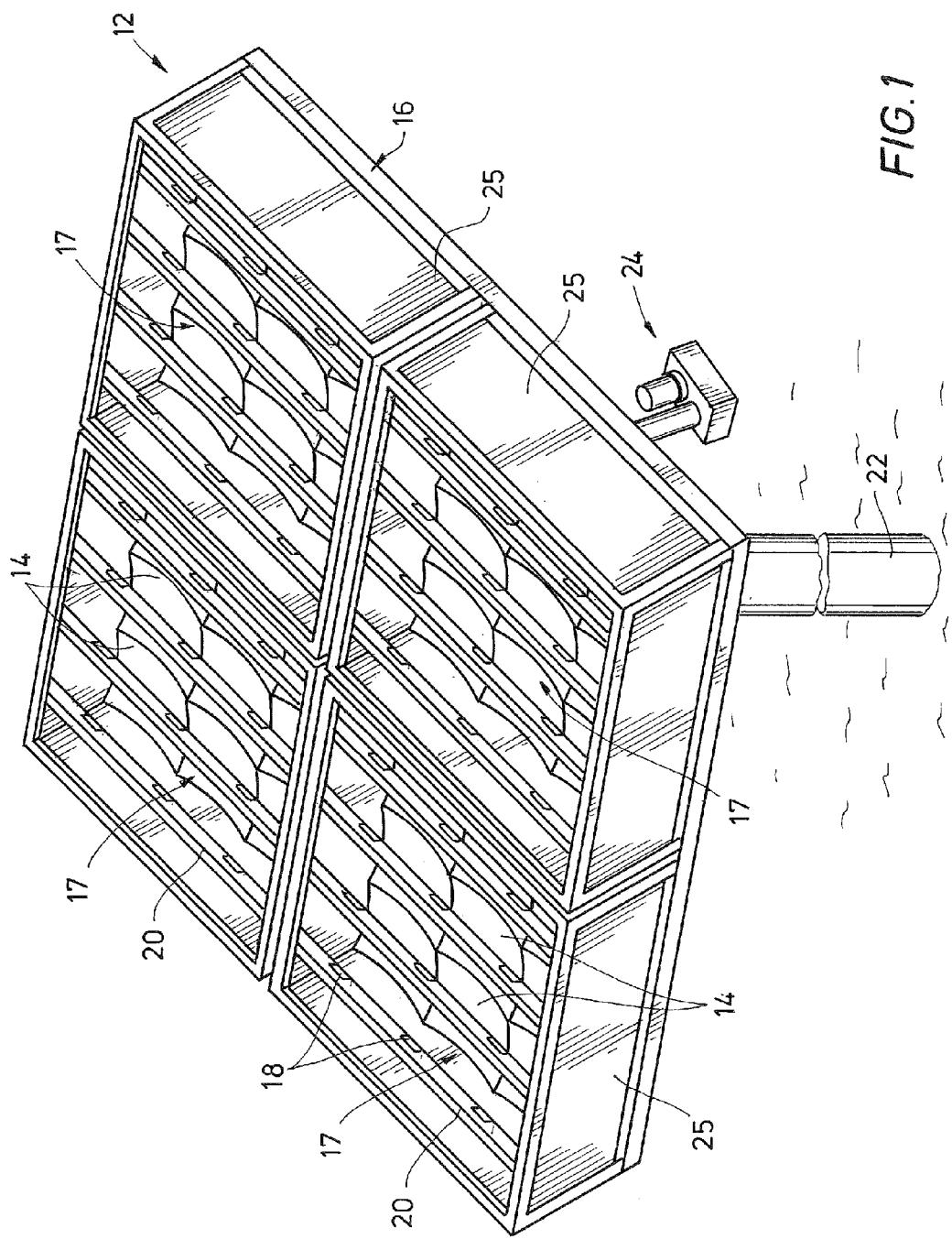
FIG. 1 is a perspective view of an example embodiment of an array of solar collectors mounted on a moveable frame in accordance with the present invention.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation. Accordingly, the improvements herein described are therefore to be limited only by the scope of the appended claims.

FIG. 1 is a perspective view of a solar conversion system 10 that includes a solar array 12 made up of modules, where a module is a grouping of solar collectors 14. The array 12 is mounted on a frame 16, and suspended over the collectors 14 are receivers 18 that mount on rails 20 shown extending lengthwise and supported by frame 16. In one embodiment, the collectors 14 are arranged into groups that define a module 17. In the example of FIG. 1, the array 12 includes 4 modules 17, wherein each module 17 includes 12 collectors 14. A vertical monopole 22 is shown set into a surface, such as the ground, a rooftop, or other structure, and supports the frame 16 at an elevation above grade and positioned for unobstructed movement. Further illustrated in the example of FIG. 1 is an elevation motor 24 for elevating one end of the array 12 for positioning the array 12 in a designated orientation. Further in the example of FIG. 1, sidewalls 25 may be provided around each module 17.

Figure 2:
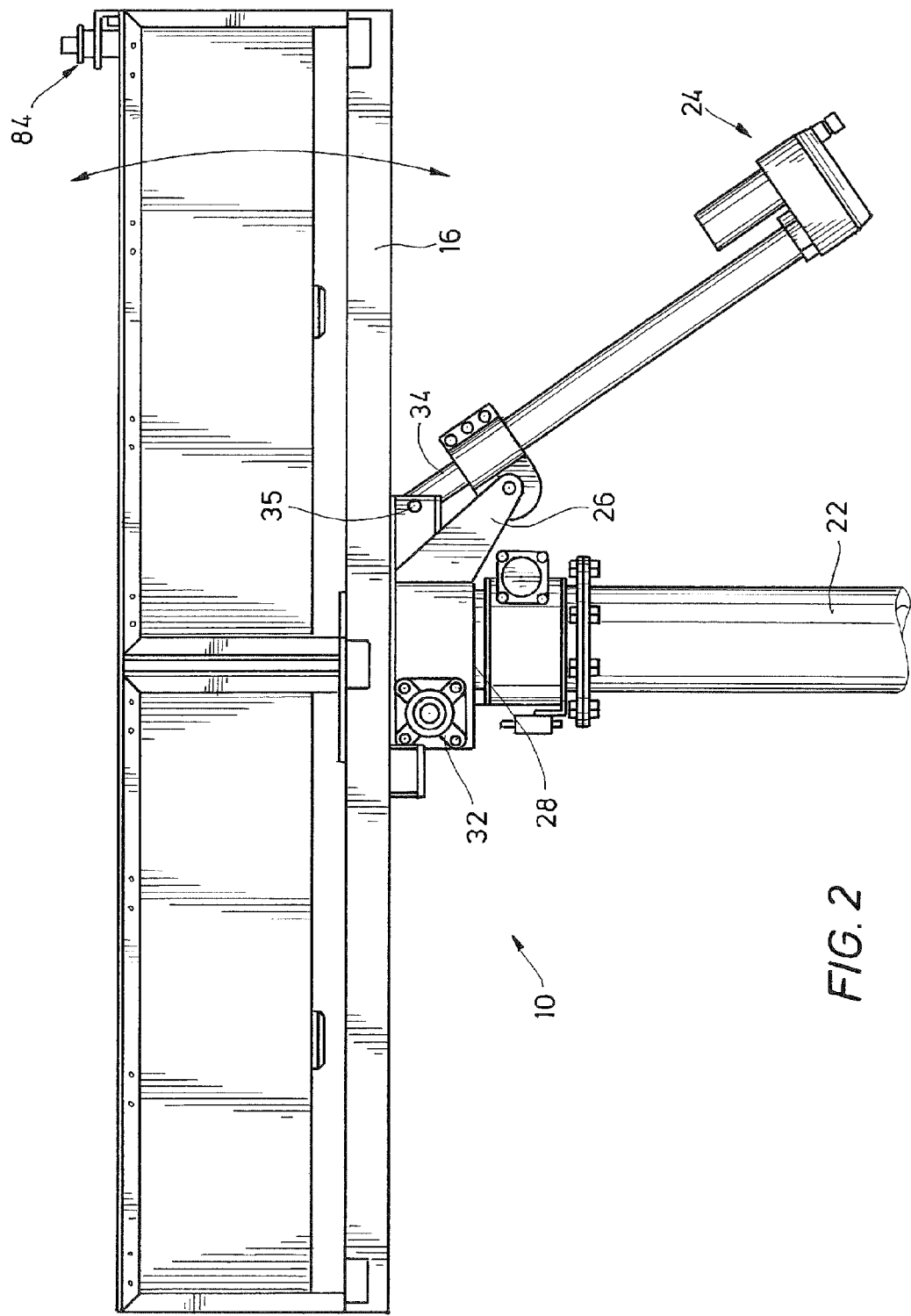
FIG. 2 is a side view of the array of FIG. 1 showing an example of an elevation means for tilting the array in accordance with the present invention.

A side view of the solar conversion system 10 provided in FIG. 2 and illustrates the elevation motor 24 depending downward from the frame 16 and mounted to a bracket 26. In the example of FIG. 2 the bracket 26 is elongate and depends from a hub 28 and generally oblique to monopole 22. The hub 28 is mounted on an upper end of monopole 22 and can rotate with respect to the monopole 22. The embodiment of the hub 28 of FIG. 2 has an opening on its lower end for receiving the upper end of the monopole 22. The frame 16, which has a generally rectangular outer periphery, pivotingly mounts on an upper end of hub 28 by clevis members 30 (FIG. 3) and hinge rod 32. The clevis members 30, which are generally planar members, each have an end attached to an upper end of hub 28. The end rod 32 is received in bores formed laterally through the clevis members 30 and that orients substantially parallel to frame 16. Elevation motor 24 has a selectively extendable leg 34 that projects from its upper end and pivotingly attaches to a pivot beam 35 that is shown attached to a lower surface of frame 16. Leg 34 is urged upward for pushing upward one end of frame 16, thereby allowing for tilting of the array 12 as illustrated by the curved arrow.

Figure 3:
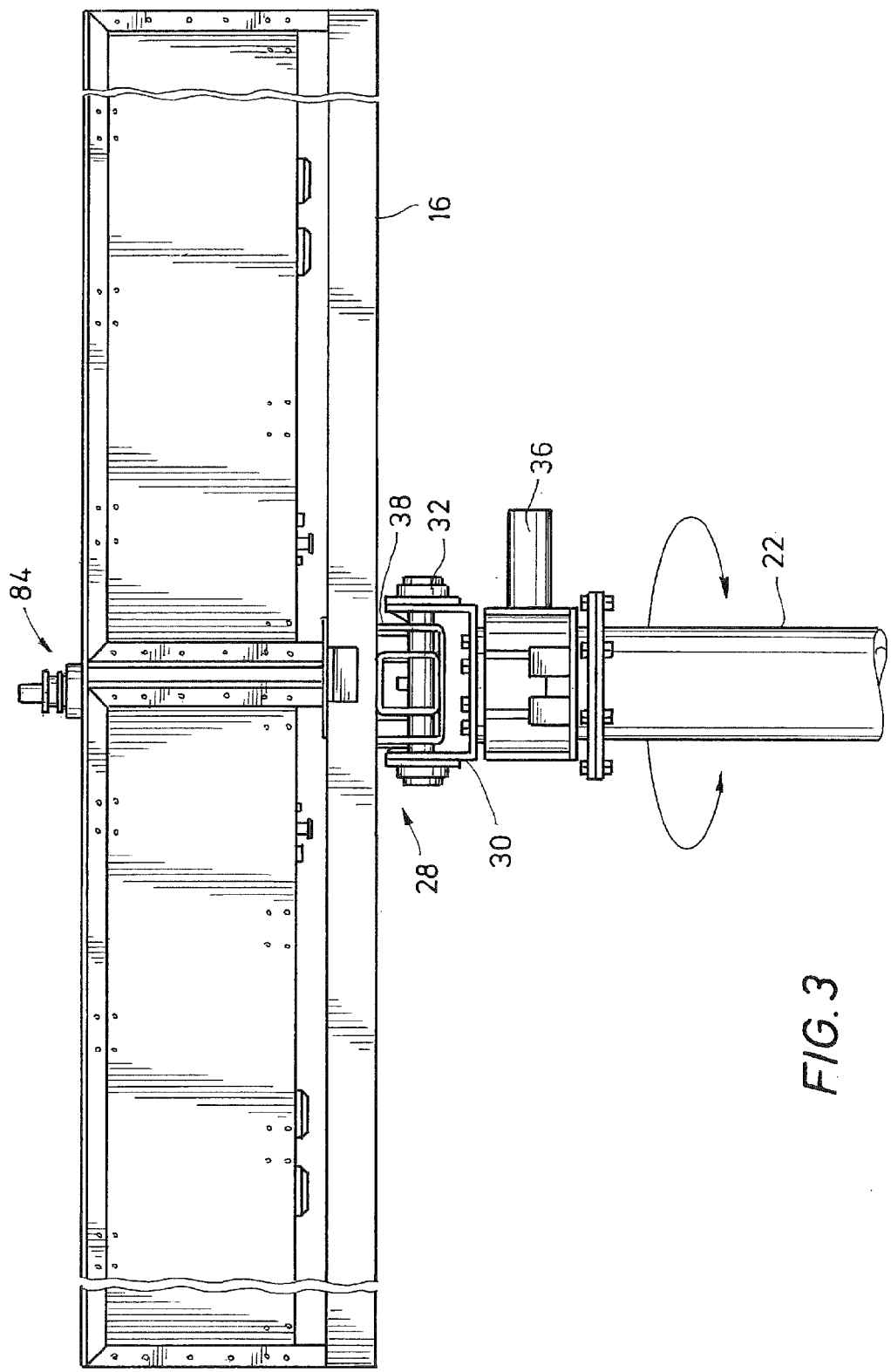
FIG. 3 is a front view of the array of FIG. 1 showing an example of an azimuthal orientation means in accordance with the present invention.

In FIG. 3 a front view is shown of an example of the solar conversion system 10 that depicts an azimuthal motor 36 next to the monopole 22 and hub 28. The azimuthal motor 36 provides relative rotation of the hub 28 with respect to monopole 22, thereby azimuthally orienting array 12 as illustrated by the curved arrow around monopole 22. Hinge member 38 mounts on a lower end of frame 16 and depends downward to between the clevis members 30. A bore through hinge member 38 registers with the bores through the clevis members 30, so that the hinge rod 32 can engage clevis members 30 to hinge member 38, and allow pivoting movement of clevis members 30 with respect to hub 28.

Figure 4:
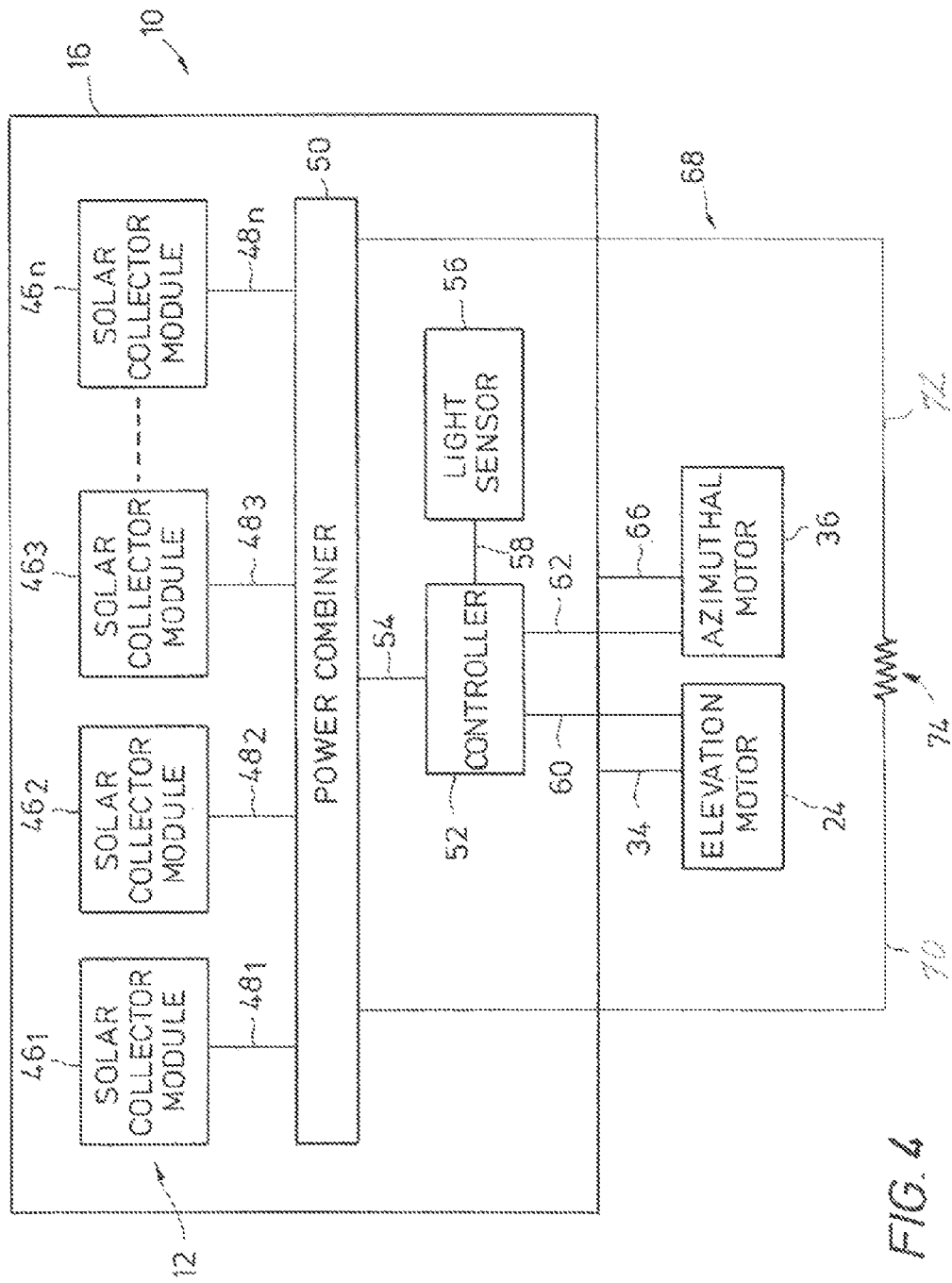
FIG. 4 is a schematic illustration of the array of FIG. 1 with positioning means in accordance with the present invention.

FIG. 4 provides a schematic illustration of the solar conversion system 10 and wherein the array 12 is subdivided into a number of modules $46_1, 46_2, 46_3, \ldots, 46_n$, where n can be any value greater than 3. In an example, each of the modules $46_1, 46_2, 46_3, \ldots, 46_n$ includes twelve solar collectors 14. Lines $48_1, 48_2, 48_3, \ldots, 48_n$ are shown extending from the modules $46_1, 46_2, 46_3, \ldots, 46_n$ and to a power combiner 50, where the lines $48_1, 48_2, 48_3, \ldots, 48_n$ provide communication for electricity generated within the receivers 18 (FIG. 1). In an example, the electricity from the modules $46_1, 46_2, 46_3, \ldots, 46_n$ is combined in series within the power combiner 50. Further illustrated in the example of FIG. 4 is a controller 52 that is in communication with power combiner 50 via line 54. In an example, the controller 52 can monitor power delivered to the power combiner 50. A light sensor 56 is schematically illustrated on the frame 16 and in communication with controller 52 via link 58. Examples of the link 58 include wiring, wireless signals, telemetry and other forms of signal communication. Additional links 60, 62 illustrate communication between the controller 52 and elevation motor 24 and azimuthal motor 36. As such, in one example signals generated within controller 52 may be transmitted via link 60 for actuating leg 34 attached to elevation motor for pivoting the panel 16 thereby adjusting orientation of the array 12. Similarly, signals via link 62 from controller 52 to azimuthal motor, may azimuthally orient frame 16 via connection 66 to azimuthally adjust orientation of the array 12. Further illustrated in the example of FIG. 4 is a circuit 68 connecting to power combiner 50 that includes lines 70, 72 that by communication between the power combiner 50 and a load 74. The load can be anything consuming electricity, as well as means for storing electricity for later use.

FIG. 5 is a graph 76 that illustrates a measured on-axis plot 78 that represents values of azimuth and elevation of array 12 over time. In an example, elevation is the angle of the array 12 with respect to vertical, and azimuth is the angle a centerline projecting from the array 12 varies from true North. The azimuth and elevation values used to create plot 78 are those that result in a maximum power output of the array 12. Also provided on the graph 76 is a sensor on-axis plot 80, shown in dashed outline, which represents an example of azimuth and elevation values to orient an array 12 over the course of a day wherein a sun sensor would yield a maximum output. The spatial difference between plot 78, 80 defines an offset 82, which as described in more detail below may be compensated for to maximize power output from the array 12.

In FIG. 6A provides a perspective view of one example of a sun sensor 84 shown having photo-transistors 86 set in a planar base 88, and a stand 90 on the base 88 set between the transistors 86. FIG. 6B is a partial sectional view of the sun sensor 84 and taken along lines 6B-6B. Shown in the embodiment of FIG. 6B recesses $91_1$, $91_2$, $91_3$, $91_4$ are formed into the lateral side walls of the stand 90 and extend from a lower end of the stand 90 to roughly a mid-portion of stand 90. The photo-transistors $86_1$, $86_2$, $86_3$, $86_4$ are set on the base 88 such that at least a portion of each transistor $86_1$, $86_2$, $86_3$, $86_4$ extends into a corresponding recess $91_1$, $91_2$, $91_3$, $91_4$. The photo-transistors $86_1$, $86_2$, $86_3$, $86_4$ are numbered to indicate an example of a location. To illustrate, an embodiment exists wherein photo-transistor $86_1$ is referred to as an upward transistor and oppositely disposed photo-transistor $86_3$ is designated as a downward transistor. Similarly, photo-transistor $86_2$, which is on a lateral side of the stack 90 and adjacent both photo-transistor $86_1$ and photo-transistor $86_3$, is referred to as an east transistor. Similarly, photo-transistor $86_4$ is designated as a west transistor. In an example, the transistors $86_1$, $86_2$, $86_3$, $86_4$ are wired so that if one of the transistors is fully exposed to sunlight, and the oppositely disposed transistor is fully shaded, the transistors yield a signal output of about 100%. In contrast, if an oppositely disposed photo-transistor is fully illuminated by sunlight and the original transistor is shaded, the transistors are configured to give an output of around 0%. In conditions where each transistor has roughly an equal amount of sunlight exposure, the total output will be around 50%. As such, knowing the orientation of the oppositely disposed photo-transistors with respect to orientation of a solar panel, alignment of the panel can be approximated by monitoring an output value of the photo-transistors. In one specific example, when a signal output from photo-transistors $86_1$, $86_3$ is about 100%, photo-transistor $86_1$ is fully illuminated, and photo-transistor $86_3$ is substantially fully shaded, whereas signal output of zero indicates an opposite orientation, e.g. photo-transistor $86_3$ is fully illuminated, and photo-transistor $86_1$ is substantially fully shaded. Following the same reasoning for signal outputs of photo-transistors $86_2$ and $86_4$, monitoring the output of these transistors provides a general indication of an orientation of the solar array on which the sun sensor 84 is mounted. Thus, orienting a solar array based solely on measured output from sun sensor 84, an orientation of an associated array 12 would be adjusted so that each of the pairs of photo-transistors would yield signal values of around 50%. Moreover, knowing that signal outputs of greater than 50 or less than 50 for either pair means at least one of the photo-transistors is shaded and to achieve an on-axis orientation, adjusting the elevation and/or azimuth of the array 12 could be undertaken to achieve an on-axis orientation. Knowing the magnitude of the signal output yields an indication of in which direction the adjustment should take place.

Figure 7:
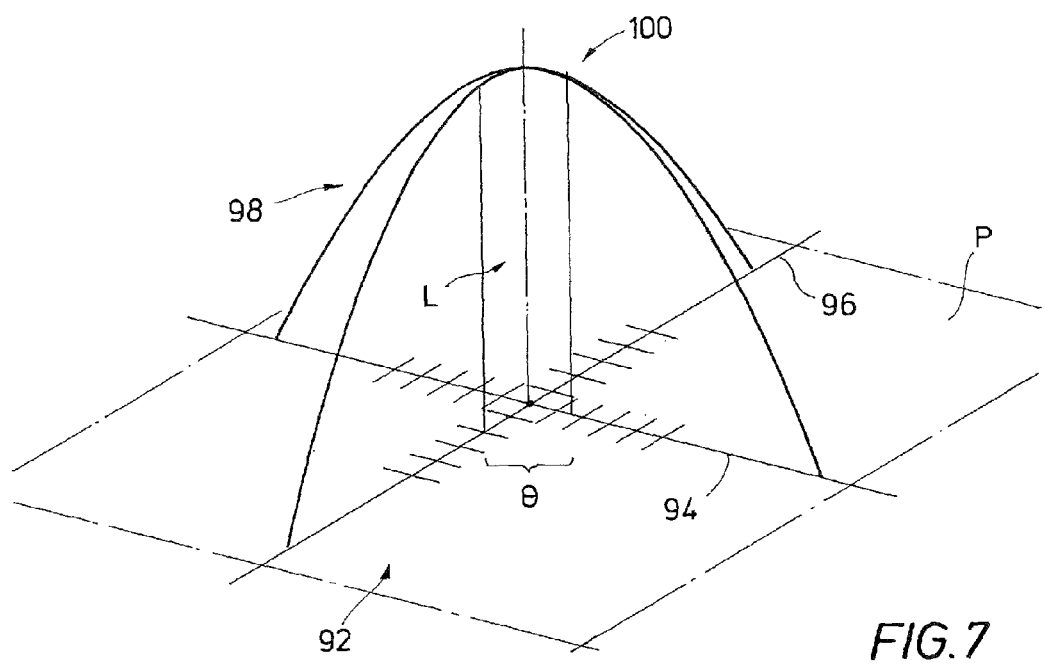
FIG. 7 is a graphical illustration of solar flux generated by a solar collector with respect to elevation and azimuth of the solar collector and in accordance with the present invention.

Included in FIG. 7 is a 3-dimensional graph 92 where an example azimuth axis 94 and elevation axis 96 are shown in a plane P, and a plot 98 extends over axis 94, 96. The example plot 98 is shown having an apex 100 centered over the intersection of axis 94, 96. Also illustrated is a line L that extends from the intersection of axis 94, 96, in a direction substantially normal to plane P and intersects plot 98. In the example of FIG. 7, where line L intersects plot 98 represents the flux produced by solar array when the array is "on-axis" with the sun. Thus, in an on axis condition, line L would be coaxial with an axis of a path of direct sunlight onto the array. Further illustrated in FIG. 7, is how changes in angular orientation along one or both of the azimuth axis 94 and elevation axis 96 can affect the magnitude of the flux. In one example, an acceptance angle θ is shown where these variations and rotation on either axis 94, 96 does not substantially affect magnitude of the flux. In an example embodiment, an acceptance angle of about 0.5 degrees correlates to maintaining about 90% of the maximum flux. Thus, optimizing the power output of a solar array can include monitoring orientation of the array so that offset angle between the on-axis configuration is kept within the acceptance angle.

As is known, relative movement between a solar array 12 and the sun requires repositioning of the array so that an on-axis orientation can be maintained. While the sun sensor of FIGS. 6A and 6B may provide an on-axis orientation of the sun sensor 84, manufacturing tolerances and other possible misalignments, can limit the ability of a sun sensor to accurately access an on-axis orientation of a solar array. To overcome these misalignments, output of the sun sensor 84 and the power output from the solar array 12 may be monitored to determine an offset 82. In one example of operation, signal output from the sun sensor 84 is monitored over time, and when the signal output reaches a designated threshold value, the array is moved about its azimuth angle and/or elevation angle. Moreover, as described above, signal output values from the sun sensor 84, e.g., greater than or less than 50%, can indicate in which direction the array 12 should be moved. Referring back to FIG. 7, because a range of orientation of a solar array 12 is limited to its acceptance angle θ, the array 12 is moved until it is at an edge of its acceptance angle θ with the sunlight. Thus in one example, an acceptance angle of the sensor 84 may be greater than that of the acceptance angle θ of the solar array 12. For the purposes of discussion herein, an acceptance angle of the sun sensor 84 described an angle of rotation in either an azimuthal or elevational orientation, wherein output of one of the pairs of photo-transistors varies from about 0% to about 100%. In one example embodiment, the acceptance angle for the sun sensor 84 is around 3 degrees, wherein an acceptance angle θ of a corresponding solar array 12 is around 0.5 degrees.

An example method of using the sun sensor 84 for positioning of the solar array includes simultaneously monitoring outputs from the sun sensor 84 and monitored power from the array 12; also recorded are the azimuthal and elevational orientations of the array 12 when the outputs are monitored. This step of monitoring can occur as the array 12 is being moved to adjust for relative movement of the sun. These monitored outputs with respect to orientation can then be compared to one another for assessing or estimating an offset 82. For example, if signals from the sun sensor 84 indicate an on-axis orientation at an azimuth elevation that is different from an azimuth elevation where the solar array 12 has a maximum power output, the difference in these respective azimuths in elevations can define an offset value 83. As such, knowing the offset value 83, the sun sensor 84 can be used for orienting the solar array 12, and then the array can be further adjusted by a value of the offset 82.

Figure 8:
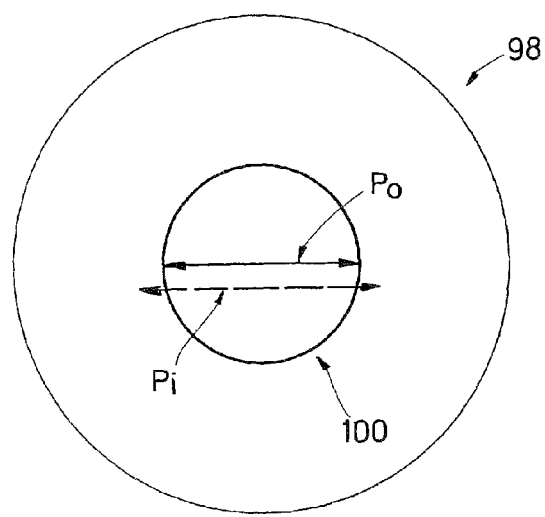
FIG. 8 is a graphical illustration in a plan view of the flux plot of FIG. 7.

To illustrate an example of estimating an offset value, an overhead view of the plot 98 is provided in FIG. 8. In this example, a path $P_O$ illustrates an example of movement of the intersection of the azimuth and elevation axis 94, 96 of FIG. 7 and how this movement is maintained within the boundaries of the apex 100. As such, containing this orientation within the apex 100 results in a continuous output of power as close as possible to the maximum power output of the solar conversion system 10. To contrast an example, a path $P_I$ shown in dashed outline has start and end points outside the apex 100, path $P_I$ illustrates an example of orienting solar array 12 based on outputs from sun sensor 84 and without applying an offset value; as such, an overall drop off in system power output is experienced if the offsets are not accounted for.

A similar offset may be utilized in situations when shading from clouds or other obstructions limit the ability to acquire an on-axis orientation by use of the sun sensor 84 or power output from the array 12. In this example, actual on-axis positions are monitored during use, and these positions are compared to an ephemeral equation based on the location of the solar array 12 and date and time in question. Manufacturing tolerances in addition to settling of the ground beneath the array 12 will likely produce some differences between the actual on-axis condition in those predicted by the ephemeral equation. Thus by maintaining a history of the offsets when clouds obstruct the view of the sun, a threshold value is determined by the controller 52, and the tracking of the sun can switch to the ephemeral equation and be adjusted by the estimated ephemeral offset.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A method of positioning an array of solar collectors comprising:
    a. monitoring an output from a sun sensor that is positioned on the array separate from the solar collectors;
    b. orienting the array so that the output from the sun sensor is substantially at a maximum value;
    c. monitoring a power output from the array and associated orientation of the array when the array is on-axis;
    d. estimating an offset value based on a comparison between the orientations of the array when the output from the sun sensor is substantially at the maximum value, and the array is on-axis; and
    e. adjusting orientation of the array based on the offset value.

2. The method of claim 1, wherein step (e) takes place as the array is being reoriented.

3. The method of claim 1, wherein the sun sensor has an acceptance angle that is around 3 degrees and acceptance angles of the solar collectors are around 0.5 degrees.

4. The method of claim 1, wherein the step of reorienting the array comprises adjusting an elevation of one end of the array and adjusting an azimuthal orientation of the array.

5. The method of claim 1, wherein the step of estimating an offset value comprises estimating a difference between an orientation of the array when the sun sensor is on-axis with the sun so that the output from the sun sensor is at about a maximum value, and an orientation of the array when the array is on-axis with the sun so that the power output from the array is at about a maximum value.

6. The method of claim 5, wherein the orientation of the array consists of an elevation of the array, an azimuth of the array, and combinations thereof.

7. The method of claim 1, further comprising identifying an orientation of the array corresponding to a maximum power output of the array to define a maximum power orientation, comparing the maximum power orientation with an ephemeral orientation to define an ephemeral offset, and adjusting orientation of the array based on the ephemeral orientation and the ephemeral offset during sunlight obstruction times.

8. The method of claim 1, wherein the solar collectors reflect light from the sun to generate power, and wherein in step (c) the array is moved into an orientation that is ahead of an on-axis orientation with the sun, so that the solar collectors will be on-axis with the sun at a future time due to relative movement of the sun.

9. A method of orienting an array of solar collectors with a path of the sun comprising:
    a. sensing an intensity of the sun with a sun sensor disposed at a particular location on the array and which is separate from the solar collectors;
    b. adjusting an orientation of the array when the sensed intensity is at a value that is less than a maximum value;
    c. monitoring a power output from the array and the sensed intensity as the orientation of the array is being adjusted;
    d. identifying an orientation of the array when the power output is at a maximum value to define a maximum power orientation, and identifying an orientation of the array when the sensed intensity is at the maximum value to define a maximum intensity orientation;
    e. estimating a sensing offset by comparing the maximum power orientation with the maximum intensity orientation; and
    f. further adjusting the orientation of the array by the sensing offset so that the array is in the maximum power orientation.

10. The method of claim 9, further comprising repeating steps (a)-(f) so that the array is at an on-axis orientation with the sun.

11. The method of claim 9, wherein after step (f) an axis of rays from the sun is aligned with an edge of an acceptance angle of the array, and the array is positioned so that the path of the sun moves the axis to an opposite edge of the acceptance angle of the array.

12. The method of claim 9, wherein the intensity of the sun is measured with a sun sensor having an acceptance angle having a value at least twice of a value of an acceptance angle of the array.

13. The method of claim 9, wherein the array comprises modules, the method further comprising monitoring an output power from each of the modules.

14. The method of claim 1, wherein the step of further adjusting the orientation of the array by the offset value puts the array into an orientation wherein the array generates an output of power close to a value of a maximum value of power output of the array.

15. A method of positioning an array of solar collectors comprising:
    a. monitoring an output from a sun sensor on the array;
    b. identifying an orientation of the array when the output from the sun sensor reaches a designated value;
    c. reorienting the array based on the designated value;
    d. monitoring a power output from the array;
    e. estimating an offset value based on a comparison between the output from the sun sensor and the power output from the array; and
    f. adjusting orientation of the array based on the offset value; and g. identifying an orientation of the array corresponding to a maximum power output of the array to define a maximum power orientation, comparing the maximum power orientation with an ephemeral orientation to define an ephemeral offset, and adjusting orientation of the array based on the ephemeral orientation and the ephemeral offset during sunlight obstruction times.

* * * * *